(12) United States Patent
Saito et al.

(10) Patent No.: US 10,611,859 B2
(45) Date of Patent: Apr. 7, 2020

(54) PROCESS FOR PRODUCING FLUORINATED POLYMER

(71) Applicant: AGC Inc., Chiyoda-ku (JP)

(72) Inventors: Susumu Saito, Chiyoda-ku (JP); Wakako Hashimoto, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 316 days.

(21) Appl. No.: 15/848,057

(22) Filed: Dec. 20, 2017

(65) Prior Publication Data

US 2018/0118858 A1    May 3, 2018

Related U.S. Application Data

(63) Continuation of application No. PCT/JP2016/073780, filed on Aug. 12, 2016.

(30) Foreign Application Priority Data

Aug. 21, 2015   (JP) .................. 2015-163725

(51) Int. Cl.
| | |
|---|---|
| *C08F 14/18* | (2006.01) |
| *C08F 6/00* | (2006.01) |
| *C08F 34/02* | (2006.01) |
| *C08F 6/10* | (2006.01) |
| *C08F 24/00* | (2006.01) |

(52) U.S. Cl.
CPC ............ *C08F 14/185* (2013.01); *C08F 6/001* (2013.01); *C08F 6/10* (2013.01); *C08F 24/00* (2013.01); *C08F 34/02* (2013.01)

(58) Field of Classification Search
CPC ........... C08F 14/185; C08F 6/10; C08F 24/00
See application file for complete search history.

(56) References Cited

U.S. PATENT DOCUMENTS

| | | |
|---|---|---|
| 6,770,404 B1 | 8/2004 | Wheland et al. |
| 6,824,930 B1 | 11/2004 | Wheland et al. |
| 2009/0227749 A1* | 9/2009 | Tayanagi ............. C08F 214/18 526/214 |
| 2013/0245219 A1 | 9/2013 | Perry et al. |
| 2015/0376100 A1 | 12/2015 | Zenke et al. |
| 2016/0028099 A1 | 1/2016 | Saito et al. |

FOREIGN PATENT DOCUMENTS

| | | |
|---|---|---|
| JP | 9-136917 | 5/1997 |
| JP | 2003-514955 | 4/2003 |
| JP | 3603425 | 12/2004 |
| JP | 2009-209365 | 9/2009 |
| JP | 2014-500392 | 1/2014 |
| JP | 5569660 | 8/2014 |
| JP | 2014-159410 | 9/2014 |
| WO | WO 2014/175123 A1 | 10/2014 |
| WO | WO 2016/104379 A1 | 6/2016 |

OTHER PUBLICATIONS

International Search Report dated Oct. 18, 2016 in PCT/JP2016/073780 filed Aug. 12, 2016.

* cited by examiner

*Primary Examiner* — Hui H Chin

(74) *Attorney, Agent, or Firm* — Oblon, McClelland, Maier & Neustadt, L.L.P.

(57) ABSTRACT

To provide a process for producing a fluorinated polymer having a cyclic structure at a relatively low cost, by efficiently recovering, from a mixture containing a fluorinated polymer obtained by polymerizing a perfluoromonomer having a cyclic structure and an unreacted perfluoromonomer having a cyclic structure, the unreacted perfluoromonomer having a cyclic structure. A monomer component containing a perfluoromonomer having a specific cyclic structure is polymerized in the presence of a polymerization initiator at a predetermined polymerization temperature to obtain a mixture containing a fluorinated polymer and an unreacted cyclic structure monomer, and the perfluoromonomer having a cyclic structure is recovered from the mixture at a temperature of at most the maximum ultimate temperature of the polymerization temperature+12° C. and at most the 10 hour half-life temperature of the polymerization initiator+12° C. under a pressure of less than the atmospheric pressure.

8 Claims, No Drawings

PROCESS FOR PRODUCING FLUORINATED POLYMER

TECHNICAL FIELD

The present invention relates to a process for producing a fluorinated polymer having a cyclic structure.

BACKGROUND ART

As an electrolyte material to be contained in a catalyst layer of a membrane/electrode assembly for a polymer electrolyte fuel cell, a fluorinated polymer having a cyclic structure and ion exchange groups has been proposed in view of excellent power generation properties of the membrane/electrode assembly (for example, Patent Document 1).

The fluorinated polymer having a cyclic structure and ion exchange groups is produced by converting, of a fluorinated polymer having a cyclic structure and ion exchange group precursor groups such as —$SO_2F$ groups, the ion exchange group precursor groups to ion exchange groups (such as —$SO_3^-H^+$).

The fluorinated polymer having a cyclic structure and —$SO_2F$ groups may be produced, for example, by copolymerizing either one or both of a perfluoromonomer having a cyclic structure and a —$SO_2F$ group and a perfluoromonomer having a cyclic structure and having no —$SO_2F$ group, and tetrafluoroethylene (hereinafter sometimes referred to as TFE) and as the case requires, a perfluoromonomer having a —$SO_2F$ group and having no cyclic structure.

In a case where monomer components are polymerized to produce a fluorinated polymer, a mixture containing the fluorinated polymer, an unreacted monomer and a polymerization medium is obtained. Therefore, it is necessary to separate and recover the unreacted monomer and the polymerization medium from the mixture.

In order to recover the unreacted monomer and the polymerization medium directly from the mixture after the reaction efficiently, usually, the mixture is heated to a temperature sufficiently higher than the polymerization temperature under a pressure lower than the atmospheric pressure (for example, Patent Documents 2 and 3).

PRIOR ART DOCUMENTS

Patent Documents

Patent Document 1: WO2014/175123
Patent Document 2: Japanese Patent No. 3603425
Patent Document 3: Japanese Patent No. 5569660

DISCLOSURE OF INVENTION

Technical Problem

However, if conventional technique to recover the unreacted monomer is applied to recovery of an unreacted perfluoromonomer having a cyclic structure as it is, the unreacted perfluoromonomer having a cyclic structure cannot efficiently be recovered.

Since the perfluoromonomer having a cyclic structure is an expensive compound, if it cannot be efficiently recovered and reused, the production cost of the fluorinated polymer having a cyclic structure tends to increase.

The present invention provides a process for producing a fluorinated polymer having a cyclic structure at a relatively low cost, by efficiently recovering, from a mixture containing a fluorinated polymer obtained by polymerizing a perfluoromonomer having a cyclic structure and an unreacted perfluoromonomer having a cyclic structure, the unreacted perfluoromonomer having a cyclic structure.

Solution to Problem

The present inventors have conducted extensive studies on recovery of an unreacted perfluoromonomer having a cyclic structure and as a result, found that the perfluoromonomer having a cyclic structure is easily decomposed or polymerized by the presence of an unreacted polymerization initiator in the mixture, and that to efficiently recover the unreacted perfluoromonomer having a cyclic structure, with respect to the temperature conditions and the pressure conditions at the time of the recovery, not only reactivity of the unreacted perfluoromonomer having a cyclic structure but also properties of the unreacted polymerization initiator should be considered. The present invention has been accomplished on the basis of such a discovery.

The present invention has the following aspects.

[1] A process for producing a fluorinated polymer, which comprises polymerizing a monomer component containing at least one cyclic structure monomer selected from the group consisting of a compound represented by the following formula (m11), a compound represented by the following formula (m12), a compound represented by the following formula (m13) and a compound represented by the following formula (m14) in the presence of a polymerization initiator at a predetermined polymerization temperature to obtain a mixture containing a fluorinated polymer and an unreacted cyclic structure monomer, and recovering the cyclic structure monomer from the mixture at a temperature of at most the maximum ultimate temperature of the polymerization temperature+12° C. and at most the 10 hour half-life temperature of the polymerization initiator+12° C. under a pressure of less than the atmospheric pressure:

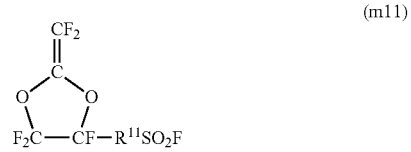

(m11)

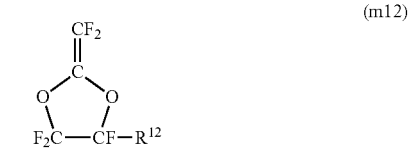

(m12)

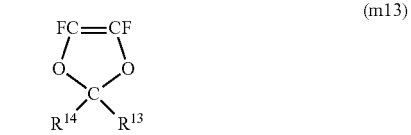

(m13)

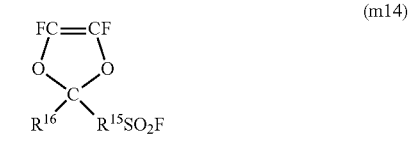

(m14)

wherein each of $R^{11}$, $R^{12}$, $R^{13}$, $R^{14}$, $R^{15}$ and $R^{16}$ is a $C_{1-10}$ perfluoroalkylene group or a group having an etheric oxygen atom in a carbon-carbon bond of a $C_{2-10}$ perfluoroalkylene group.

[2] The process for producing a fluorinated polymer according to [1], wherein the proportion of the cyclic structure monomer recovered from the mixture is at least 75 mass % based on the cyclic structure monomer (100 mass %) contained in the mixture.

[3] The process for producing a fluorinated polymer according to [1] or [2], wherein the monomer component further contains at least one —SO$_2$F group-containing monomer selected from the group consisting of a compound represented by the following formula (m21), a compound represented by the following formula (m22) and a compound represented by the following formula (m23):

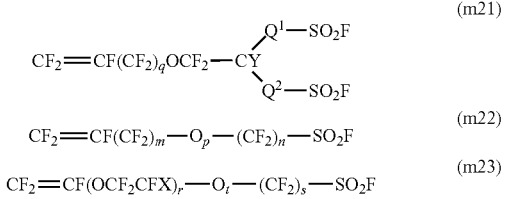

wherein q is 0 or 1, Y is a fluorine atom or a monovalent perfluoroorganic group, Q$^1$ is a perfluoroalkylene group which may have an etheric oxygen atom, Q$^2$ is a single bond or a perfluoroalkylene group which may have an etheric oxygen atom, m is 0 or 1, provided that m is 0 when p is 0, p is 0 or 1, n is an integer of from 1 to 12, X is a fluorine atom or a trifluoromethyl group, r is an integer of from 1 to 3, t is 0 or 1, and s is an integer of from 1 to 12.

[4] The process for producing a fluorinated polymer according to any one of [1] to [3], wherein the monomer component further contains tetrafluoroethylene.

[5] The process for producing a fluorinated polymer according to any one of [1] to [4], wherein at least one member of the cyclic structure monomer is a compound represented by the following formula (m12-1):

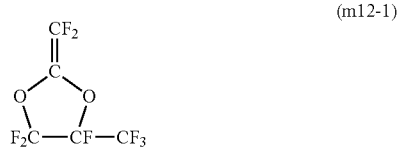

[6] The process for producing a fluorinated polymer according to any one of [1] to [4], wherein at least one member of the cyclic structure monomer is a compound represented by the following formula (m13-1):

[7] The process for producing a fluorinated polymer according to any one of [1] to [6], wherein the cyclic structure monomer recovered from the mixture is reused as at least part of the monomer component.

[8] The process for producing a fluorinated polymer according to [7], which comprises polymerizing the monomer component in a polymerization medium to obtain a mixture containing the fluorinated polymer, the unreacted cyclic structure monomer and the polymerization medium, and recovering a monomer solution containing the cyclic structure monomer and the polymerization medium from the mixture and reusing the monomer solution as at least part of the monomer component and as at least part of the polymerization medium.

Advantageous Effects of Invention

According to the process for producing a fluorinated polymer of the present invention, it is possible to produce a fluorinated polymer having a cyclic structure at a relatively low cost by efficiently recovering, from a mixture containing a fluorinated polymer obtained by polymerizing a perfluoromonomer having a cyclic structure and an unreacted perfluoromonomer having a cyclic structure, the unreacted perfluoromonomer having a cyclic structure.

DESCRIPTION OF EMBODIMENTS

The following definitions of terms and representations are applicable throughout Description and Claims.

In this specification, a compound represented by the formula (m11) will be referred to as a compound (m11). Compounds represented by other formulae will be referred to in the same manner.

In this specification, a structural unit represented by the formula (u11) will be referred to as a unit (u11). Structural units represented by other formulae will be referred to in the same manner.

A "polymer" means a compound having a structure constituted by a plurality of structural units.

A "structural unit" means a unit derived from a monomer formed by polymerization of the monomer. The structural unit may be a unit formed directly by the polymerization of the monomer or may be a unit having a part of the unit converted to another structure by treating the polymer.

A "monomer" means a compound having a polymerizable carbon-carbon double bond.

An "ion exchange group" means a group having H$^+$, a monovalent metal cation, an ammonium ion or the like. The ion exchange group may, for example, be a sulfonic acid group, a sulfonimide group, a sulfonmethide group or a carboxylic acid group.

A "sulfonic acid group" includes —SO$_3^-$H$^+$ and —SO$_3^-$M$^+$ (wherein M$^+$ is a monovalent metal ion or an ammonium ion wherein one or more hydrogen atoms may be substituted by a hydrocarbon group).

<Fluorinated Polymer>

The fluorinated polymer obtainable by the production process of the present invention has structural units having a specific cyclic structure described hereinafter.

The fluorinated polymer may further have structural units having a —SO$_2$F group (excluding the structural units having a cyclic structure) described hereinafter, as the case requires.

The fluorinated polymer may further have, as the case requires, structural units other than the structural units having a specific cyclic structure and structural units having a —SO$_2$F group.

The fluorinated polymer preferably has, from such a viewpoint that it is used as a precursor of an electrolyte material to be contained in a catalyst layer of a membrane/electrode assembly, either one or both of structural units having a cyclic structure and a —SO$_2$F group and structural units having a —SO$_2$F group and having no cyclic structure.

(Structural Unit Having Cyclic Structure)

The structural unit having a specific cyclic structure is at least one type of structural unit selected from the group consisting of a unit (u11) derived from a compound (m11), a unit (u12) derived from a compound (m12), a unit (u13) derived from a compound (m13) and a unit (u14) derived from a compound (m14):

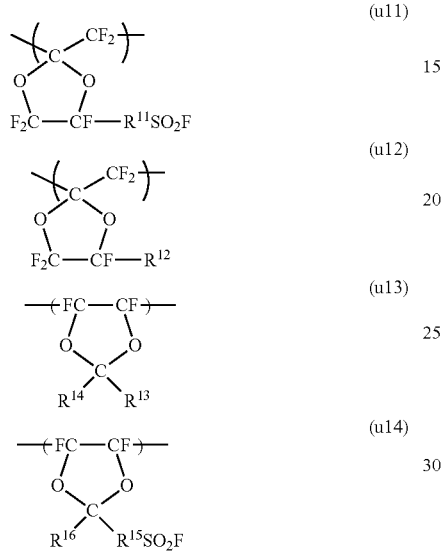

In the above formulae (m11), (m12), (m13) and (m14), each of $R^{11}$, $R^{12}$, $R^{13}$, $R^{14}$, $R^{15}$ and $R^{16}$ is a C$_{1-10}$ perfluoroalkylene group or a group having an etheric oxygen atom in a carbon-carbon bond of a C$_{2-10}$ perfluoroalkylene group.

$R^{11}$ is preferably a C$_{2-4}$ perfluoroalkylene group or a group having an etheric oxygen atom in a carbon-carbon bond of a C$_{3-4}$ perfluoroalkylene group. The perfluoroalkylene group may be linear or branched and is preferably linear.

$R^{12}$ is preferably a C$_{1-4}$ perfluoroalkyl group or a group having an etheric oxygen atom in a carbon-carbon bond of a C$_{2-4}$ perfluoroalkyl group, particularly preferably a trifluoromethyl group. The perfluoroalkyl group may be linear or branched and is preferably linear.

$R^{13}$ is preferably a C$_{1-5}$ perfluoroalkyl group, particularly preferably a trifluoromethyl group. The perfluoroalkyl group may be linear or branched and is preferably linear.

$R^{14}$ is particularly preferably a trifluoromethyl group. The perfluoroalkyl group may be linear or branched and is preferably linear.

$R^{15}$ is preferably a C$_{2-4}$ perfluoroalkylene group or a group having an etheric oxygen atom in a carbon-carbon bond of a C$_{3-4}$ perfluoroalkylene group. The perfluoroalkylene group may be linear or branched and is preferably linear.

$R^{16}$ is particularly preferably a trifluoromethyl group. The perfluoroalkyl group may be linear or branched and is preferably linear.

As the unit (u11), for example, units (u11-1) to (u11-3) may be mentioned.

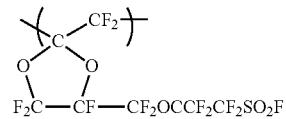

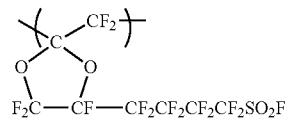

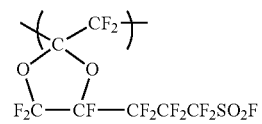

As the unit (u12), for example, units (u12-1) to (u12-2) may be mentioned, and in view of a high ion exchange capacity due to a low molecular weight and recovery of the monomer due to a low boiling point, particularly preferred is the unit (u12-1).

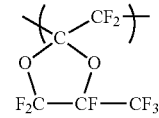

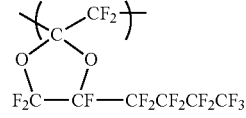

As the unit (u13), for example, units (u13-1) to (u13-3) may be mentioned, and in view of a high ion exchange capacity due to a low molecular weight and recovery of the monomer due to a low boiling point, particularly preferred is the unit (u13-1).

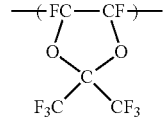

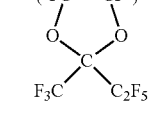

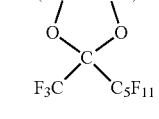

As the unit (u14), for example, units (u14-1) to (u14-2) may be mentioned.

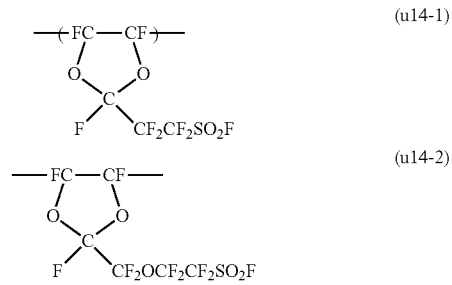

(u14-1)

(u14-2)

(Structural Unit Having —SO$_2$F Group)

The structural unit having a —SO$_2$F group (excluding the structural unit having a cyclic structure) is at least one type of structural unit selected from the group consisting of a unit (u21) derived from a compound (m21), a unit (u12) derived from a compound (m22) and a unit (u23) derived from a compound (m23).

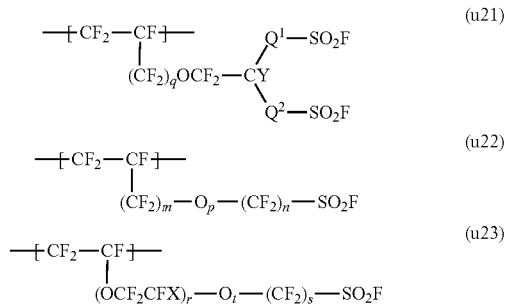

(u21)

(u22)

(u23)

q is 0 or 1.

Y is a fluorine atom or a monovalent perfluoroorganic group.

Y is preferably a fluorine atom, or a C$_{1-6}$ linear perfluoroalkyl group which may have an etheric oxygen atom.

Q$^1$ is a perfluoroalkylene group which may have an etheric oxygen atom.

Q$^2$ is a single bond or a perfluoroalkylene group which may have an etheric oxygen atom.

The number of etheric oxygen atoms, if any, in the perfluoroalkylene group as each of Q$^1$ and Q$^2$ is 1 or more. Further, such an oxygen atom may be inserted in a carbon atom/carbon atom bond of the perfluoroalkylene group or may be bonded to a terminal carbon atom.

The perfluoroalkylene group may be linear or branched and is preferably linear.

The number of carbon atoms in the perfluoroalkylene group is preferably from 1 to 6, more preferably from 1 to 4. When it is at most 6, the boiling point of the raw material compound is low, and purification by distillation will be easy. Further, when the number of carbon atoms is at most 6, a decrease of the ion exchange capacity of the fluorinated polymer can be suppressed, and a decrease of the proton conductivity can be suppressed.

Q$^2$ is preferably a C$_{1-6}$ perfluoroalkylene group which may have an etheric oxygen atom. When Q$^2$ is a C$_{1-6}$ perfluoroalkylene group which may have an etheric oxygen atom, excellent stability of the power generation performance will be obtained when a polymer electrolyte fuel cell is operated for a long period of time, as compared with a case where Q$^2$ is a single bond.

It is preferred that at least one of Q$^1$ and Q$^2$ is a C$_{1-6}$ perfluoroalkylene group having an etheric oxygen atom. A monomer having a C$_{1-6}$ perfluoroalkylene group having an etheric oxygen atom can be prepared without a fluorination reaction with a fluorine gas, and hence can be produced easily in a good yield.

m is 0 or 1, provided that m is 0 when p is 0.

p is 0 or 1.

n is an integer of from 1 to 12.

X is a fluorine atom or a trifluoromethyl group.

r is an integer of from 1 to 3.

t is 0 or 1.

s is an integer of from 1 to 12.

As the unit (u21), in view of easy production of the fluorinated polymer and easy industrial application, units (u21-1) to (u21-3) are preferred, and the unit (u21-1) is particularly preferred.

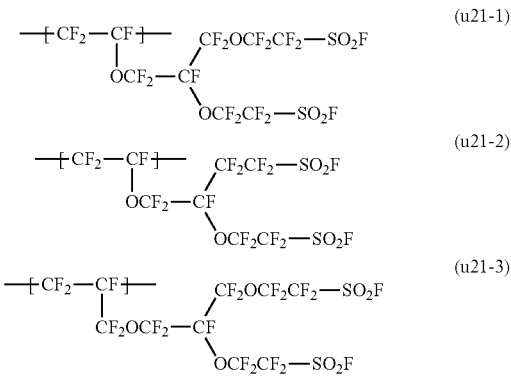

(u21-1)

(u21-2)

(u21-3)

As the unit (u22), units (u22-1) to (u22-2) are preferred.

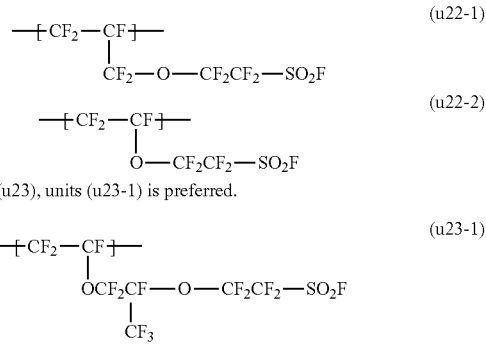

(u22-1)

(u22-2)

As the unit (u23), units (u23-1) is preferred.

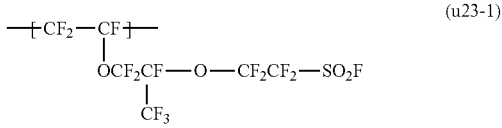

(u23-1)

(Other Structural Unit)

Other structural unit is a structural unit derived from other monomer described hereinafter.

As such other structural unit, particularly preferred is a structural unit derived from TFE, with a view to reducing the moisture content of the fluorinated polymer.

(Ion Exchange Capacity of Fluorinated Polymer)

Of the fluorinated polymer after conversion of the —SO$_2$F groups to ion exchange groups, the ion exchange capacity is preferably from 0.5 to 2.5 meq/g dry resin, more preferably from 1.0 to 2.0 meq/g dry resin. When the ion exchange capacity is at least the lower limit value of the above range, electrical conductivity of the fluorinated polymer after conversion of the —SO$_2$F groups to ion exchange groups tends to be high, and therefore when such a fluorinated polymer is used for a catalyst layer of a membrane/electrode assembly, a sufficient cell output will be obtained.

When the ion exchange capacity is at most the upper limit value of the above range, such a fluorinated polymer can easily be produced.

(TQ Value of Fluorinated Polymer)

The TQ value of the fluorinated polymer is preferably at least 150° C., more preferably from 170 to 340° C., further preferably from 170 to 300° C.

The TQ value (unit: ° C.) is an index of a molecular weight and a softening temperature of a fluorinated polymer, and is a temperature at which the extrusion rate becomes 100 mm$^3$/sec, when the fluorinated polymer is subjected to melt-extrusion under an extrusion pressure condition of 2.94 MPa from a nozzle having a length of 1 mm and an inner diameter of 1 mm. A higher TQ value indicates a higher molecular weight of the fluorinated polymer.

In the present invention, using Flow Tester (manufactured by Shimadzu Corporation, CFT-500D), the extrusion rate of the fluorinated polymer was measured by changing the temperature, whereby the TQ value at which the extrusion rate became 100 mm$^3$/sec was obtained.

<Process for Producing Fluorinated Polymer>

The process for producing a fluorinated polymer of the present invention is a process comprising the following steps (I) to (III).

(I) A step of polymerizing a monomer component containing a cyclic structure monomer in the presence of a polymerization initiator at a predetermined polymerization temperature to obtain a mixture containing a fluorinated polymer and an unreacted cyclic structure monomer.

(II) A step of recovering the cyclic structure monomer from the mixture under specific temperature conditions under specific pressure conditions and obtaining the fluorinated polymer, after the step (I).

(III) A step of washing the fluorinated polymer obtained in the step (II) with a washing medium as the case requires.

(Monomer Component)

The monomer component contains the after-mentioned specific cyclic structure monomer.

The monomer component may further contain the after-mentioned —SO$_2$F group-containing monomer (excluding the cyclic structure monomer) as the case requires.

The monomer component may further contain a monomer other than the specific cyclic structure monomer and the —SO$_2$F group-containing monomer as the case requires.

The monomer component preferably contains, from such a viewpoint that the obtainable fluorinated polymer is used as a precursor of an electrolyte material to be contained in a catalyst layer of a membrane/electrode assembly, either one or both of a monomer having a cyclic structure and a —SO$_2$F group and a monomer having a —SO$_2$F group and having no cyclic structure.

(Cyclic Structure Monomer)

The cyclic structure monomer is at least one monomer selected from the group consisting of a compound (m11), a compound (m12), a compound (m13) and a compound (m14).

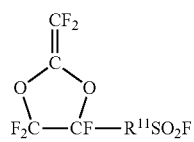
(m11)

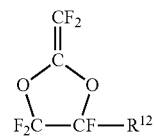
(m12)

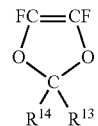
(m13)

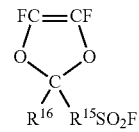
(m14)

$R^{11}$ to $R^{16}$ are as defined for the units (u11) to (u14).

As the compound (m11), for example, compounds (m11-1) to (m11-3) may be mentioned.

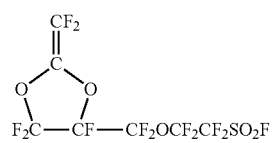
(m11-1)

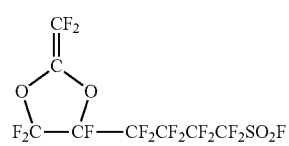
(m11-2)

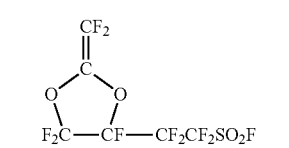
(m11-3)

As the compound (m12), for example, compounds (m12-1) to (m12-2) may be mentioned, and in view of a high ion exchange capacity due to a low molecular weight and recovery of the monomer due to a low boiling point, the compound (m12-1) is particularly preferred.

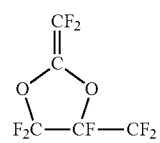
(m12-1)

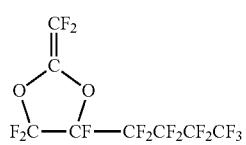
(m12-2)

As the compound (m13), for example, compounds (m13-1) to (m13-3) may be mentioned, and in view of a high ion exchange capacity due to a low molecular weight and recovery of the monomer due to a low boiling point, the unit (m13-1) is particularly preferred.

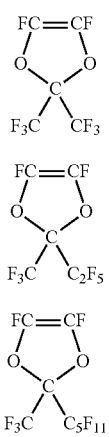
(m13-1)
(m13-2)
(m13-3)

As the compound (m14), for example, compounds (m14-1) to (m14-2) may be mentioned.

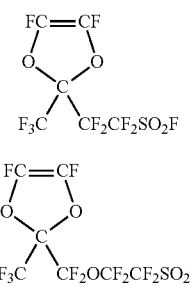
(m14-1)
(m14-2)

The compound (m11) may be prepared by the method disclosed in e.g. WO2003/037885, JP-A-2005-314388 or JP-A-2009-040909.

The compound (m12) may be prepared by the method disclosed in e.g. WO2000/056694 or Izvestiya Akademii Nauk SSSR, Seriya Khimicheskaya, 1989, Vol. 4, p. 938-942.

The compound (m13) may be prepared by the method disclosed in e.g. Macromolecule, Vol. 26, No. 22, 1993, p. 5,829-5,834 or JP-A-6-92957.

The compound (m14) may be prepared by the method disclosed in e.g. JP-A-2006-152249.

(—$SO_2F$ Group-Containing Monomer)

The —$SO_2F$ group-containing monomer (excluding the cyclic structure monomer) is at least one compound selected from the group consisting of a compound (m21), a compound (m22) and a compound (m23).

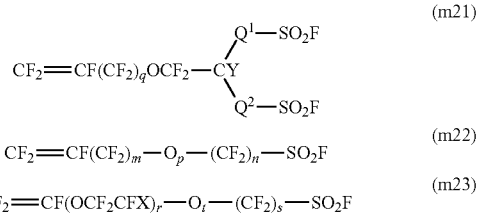
(m21)
(m22)
(m23)

q, Y, $Q^1$ and $Q^2$ are as defined for the unit (u21).
m, p and n are as defined for the unit (u22).
X, r, t and s are as defined for the unit (u23).

As the compound (m21), in view of easy production of the fluorinated polymer and easy industrial application, compounds (m21-1) to (m21-3) are preferred, and the compound (m21-1) is particularly preferred.

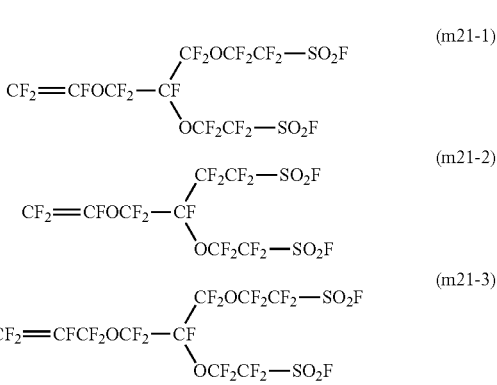
(m21-1)
(m21-2)
(m21-3)

As the compound (m22), $CF_2=CF-CF_2-O-CF_2CF_2-SO_2F$ (m22-1) or $CF_2=CF-O-CF_2CF_2-SO_2F$ (m22-2) is preferred.

As the compound (m23), $CF_2=CF-OCF_2CF(CF_3)-O-CF_2CF_2-SO_2F$ (m23-1) is preferred.

The compound (m21) may be prepared by the method disclosed in e.g. WO2007/013533 or JP-A-2008-202039.

(Other Monomer)

Other monomer may, for example, be TFE, chlorotrifluoroethylene, trifluoroethylene, vinylidene fluoride, vinyl fluoride, ethylene, propylene, perfluoro(3-butenyl vinyl ether), perfluoro(allyl vinyl ether), a perfluoro α-olefin (such as hexafluoropropylene), a (perfluoroalkyl)ethylene (such as (perfluorobutyl)ethylene), a (perfluoroalkyl)propene (such as 3-perfluorooctyl-1-propene) or a perfluoro(alkyl vinyl ether). As other monomer, TFE is particularly preferred. TFE, which has high crystallinity, has an effect to suppress swelling when the fluorinated polymer contains water and can reduce the moisture content of the fluorinated polymer.

(Step (I))

The polymerization method is selected from polymerization methods such as emulsion polymerization, solution polymerization, suspension polymerization and bulk polymerization. The polymerization method is preferably solution polymerization, which does not require use of a fluorinated emulsifier having a perfluoroalkyl group having 7 or more carbon atoms bioaccumulation of which is of concern.

In the case of solution polymerization, in a reactor, the monomer component is polymerized in a polymerization medium in the presence of a polymerization initiator at a predetermined polymerization temperature to obtain a mixture containing a fluorinated polymer, an unreacted cyclic structure monomer and the polymerization medium.

The polymerization medium is preferably a solvent such as a chlorofluorocarbon, a hydrochlorofluorocarbon, a hydrofluorocarbon or a hydrofluoroether, more preferably a hydrofluorocarbon or a hydrofluoroether having no influence over the ozone layer.

The polymerization initiator may, for example, be a diacyl peroxide (such as disuccinic acid peroxide, benzoyl peroxide, perfluorobenzoyl peroxide, lauroyl peroxide or bis(pentafluoropropionyl) peroxide), an azo compound (such as 2,2'-azobis(amidinopropane) hydrochloride, 4,4'-azobis(4-cyanovaleric acid), dimethyl 2,2'-azobisisobutyrate or azobisisobutyronitrile), a peroxyester (such as t-butyl peroxyisobutyrate or t-butyl peroxypivalate), a peroxydicarbonate (such as diisopropyl peroxydicarbonate or bis(2-ethylhexyl) peroxydicarbonate), a hydroperoxide (such as diisopropylbenzene hydroperoxide or t-butyl hydroperoxide) or a dialkyl peroxide (such as di-t-butyl peroxide or perfluoro-di-t-butyl peroxide).

The amount of the polymerization initiator added is preferably from 0.0001 to 3 parts by mass, more preferably from 0.0001 to 2 parts by mass per 100 parts by mass of the monomer component. By reducing the amount of the polymerization initiator added, the molecular weight of the obtainable fluorinated polymer can be increased. In addition to the polymerization initiator, a molecular weight adjusting agent or the like used for conventional solution polymerization may be added.

The molecular weight adjusting agent is preferably an alcohol (such as methanol, ethanol, 2,2,2-trifluoroethanol, 2,2,3,3-tetrafluoropropanol, 1,1,1,3,3,3-hexafluoroisopropanol or 2,2,3,3,3-pentafluoropropanol), a hydrocarbon (such as n-pentane, n-hexane or cyclohexane), a hydrofluorocarbon (such as $CF_2H_2$), a ketone (such as acetone), a mercaptan (such as methyl mercaptan), an ester (such as methyl acetate or ethyl acetate) or an ether (such as diethyl ether or methyl ethyl ether), more preferably an alcohol.

The amount of the molecular weight adjusting agent is preferably from 0.0001 to 50 parts by mass, more preferably from 0.001 to 10 parts by mass per 100 parts by mass of the monomer component.

The proportions of the respective monomers in the monomer component charged are selected so that the proportions of the structural units in the obtainable fluorinated polymer will be desired proportions.

The proportion of the cyclic structure monomer charged is preferably such that the proportion of the structural units having a cyclic structure in the fluorinated polymer is from 30 to 100 mass %.

The proportion of the —$SO_2F$ group-containing monomer charged is preferably such that the proportion of the structural units having a —$SO_2F$ group in the fluorinated polymer is from 20 to 90 mass %.

The proportion of TFE charged is preferably such that the proportion of the structural units derived from TFE in the fluorinated polymer is from 0 to 80 mass %.

The proportion of other monomer (excluding TFE) charged is preferably such that the proportion of the structural units derived from other monomer in the fluorinated polymer is from 0 to 30 mass %.

The respective monomers may be charged all at once or may be charged continuously or intermittently.

With respect to the polymerization temperature, the optimum value may be selected depending upon the types and the proportions charged of the monomers, and the polymerization temperature is preferably from 10 to 150° C., more preferably from 20 to 130° C., which is suitable for industrial application. The polymerization pressure (gage pressure) is from 0.1 to 5.0 MPa (gage), more preferably from 0.5 to 3.0 MPa (gage).

(Step (II))

In the case of solution polymerization, a monomer solution containing the cyclic structure monomer and the polymerization medium is recovered from the mixture.

Recovery of the monomer solution may be conducted in the reactor, or may be conducted in an evaporation container after the mixture is transferred from the reactor to the evaporation container.

Since the unreacted cyclic structure monomer may be decomposed by oxygen or moisture, the reactor and the evaporation container are preferably ones in which the mixture can be stirred in an inert gas (e.g. nitrogen gas) atmosphere or in vacuum or reduced pressure atmosphere.

With respect to the number of revolutions for stirring, the optimum number of revolutions varies depending upon the shape of the agitating blade, the size of the reactor or the evaporation container, etc., and is preferably from 1 to 500 rpm.

The temperature in the reactor or the evaporation container is at most the maximum ultimate temperature of the polymerization temperature+12° C. and the 10 hour half-life temperature of the polymerization initiator+12° C.

The temperature in the reactor or the evaporation container is preferably at most the maximum ultimate temperature of the polymerization temperature+10° C., more preferably at most the maximum ultimate temperature of the polymerization temperature+8° C. Further, the temperature in the reactor or the evaporation container is preferably at most the 10 hour half-life temperature of the polymerization initiator+10° C., more preferably at most the 10 hour half-life temperature of the polymerization initiator+8° C.

The maximum ultimate temperature of the polymerization temperature means the maximum temperature of the polymerization temperature when polymerization is conducted. In a case where polymerization is conducted at a constant polymerization temperature, the maximum ultimate temperature of the polymerization temperature agrees with the constant polymerization temperature.

When the temperature in the reactor or the evaporation container is within the above range, the unreacted cyclic structure monomer will hardly be decomposed or polymerized by the presence of an unreacted polymerization initiator in the mixture. As a result, the unreacted cyclic structure monomer can be efficiently recovered.

The temperature in the reactor or the evaporation container is preferably at least 10° C., more preferably at least 15° C., further preferably at least 20° C., with a view to further efficiently recovering the unreacted cyclic structure monomer.

The pressure (absolute pressure) in the reactor or the evaporation container is, with a view to efficiently recovering the unreacted cyclic structure monomer, less than the atmospheric pressure, preferably from 0.1 to 500 kPa (abs), more preferably from 0.1 to 300 kPa (abs).

The lower the viscosity of the mixture in the reactor or the evaporation container, the more efficiently the unreacted monomer can be recovered. Accordingly, in a case where priority is assigned to recovery properties, it is preferred to suppress the reaction rate thereby to lower the polymer concentration or to add a solvent before recovery after completion of the reaction thereby to lower the viscosity of the mixture.

The solvent to be added is preferably a chlorofluorocarbon, a hydrochlorofluorocarbon, a hydrofluorocarbon, a hydrofluoroether or the like, more preferably a hydrofluorocarbon or a hydrofluoroether which has little influence over the ozone layer. As preferred specific examples, $C_4F_9C_2H_5$, $C_6F_{13}CH_2CH_3$, $C_8F_{17}C_2H_5$, $C_6F_{13}H$, $HC_6F_{12}H$, $HC_4F_8H$, $C_6F_{14}$, $C_7F_{16}$, $CF_3CFHCFHCF_2CF_3$, $(CF_3)_2CFCFHCFHCF_3$, $CF_3CH_2OCF_2CF_2H$, $C_4F_9OCH_3$, $C_4F_9OC_2H_5$, $CF_3CF_2CF_2OCH_3$ and $(CF_3)_2CFOCH_3$ may be mentioned.

As a method of recovering the unreacted cyclic structure monomer and the polymerization medium evaporated from the reactor or the evaporation container, for example, the reactor or the evaporation container is evacuated via a cold trap or a heat exchanger to recover the unreacted cyclic structure monomer and the polymerization medium.

The proportion of the unreacted cyclic structure monomer recovered from the mixture, based on the unreacted cyclic monomer (100 mass %) contained in the mixture, that is, the cyclic structure monomer recovery rate, is preferably at least 75 mass %, more preferably at least 80 mass %, further preferably at least 90 mass %. When the cyclic structure monomer recovery rate is within the above range, the recovered unreacted cyclic structure monomer can be effectively reused as at least part of the monomer component in the step (I) and as a result, the fluorinated polymer can be produced at a further lower cost.

The recovered unreacted cyclic structure monomer may be reused as at least part of the monomer component in the step (I) as it is without purification by e.g. distillation or rectification, or may be reused as at least part of the monomer component in the step (I) after purification by e.g. distillation or rectification. In view of a small number of steps and with a view to producing the fluorinated polymer at a relatively low cost, it is preferably reused as at least part of the monomer component in the step (I) as it is without purification by e.g. distillation or rectification.

In a case where the unreacted cyclic structure monomer is recovered in the form of the monomer solution containing the unreacted cyclic structure monomer and the polymerization medium, the monomer solution may be reused as at least part of the monomer component and as at least part of the polymerization medium in the step (I) as it is without purification e.g. by distillation or rectification; or the monomer solution may be separated into the cyclic structure monomer and the polymerization medium by purification by e.g. distillation or rectification, and the respective components are reused as at least part of the monomer component and as at least part of the polymerization medium in the step (I). In view of a small number of steps and with a view to producing the fluorinated polymer at a relatively low cost, the monomer solution is preferably reused as at least part of the monomer component and as at least part of the polymerization medium in the step (I) as it is without purification by e.g. distillation or rectification.

(Step (III))

In the case of solution polymerization, the fluorinated polymer solution obtained in the step (II) is mixed with an agglomeration medium to obtain a fluorinated polymer in the form of particles, which is then washed with a washing medium.

Washing may be carried out by mixing the washing medium and the fluorinated polymer, followed by stirring or may be carried out by dissolving the fluorinated polymer in a good solvent, and then adding a poor solvent to agglomerate the fluorinated polymer.

The agglomeration medium and the washing medium may, for example, be a hydrofluorocarbon, a hydrofluoroether, a perfluorocarbon or an alcohol. As preferred specific examples, $CHF_2CH_2CF_3$, $CF_3CH_2CF_2CH_3$, $F_3C-C(F)=CH_2$, $CF_3CH_2OCF_2CF_2H$, $C_4F_9OCH_3$, $C_4F_9OC_2H_5$, $CF_3CF_2CF_2OCH_3$, $(CF_3)_2CFOCH_3$, $CF_3CF_2CH_2OH$, $CF_3CH_2OH$, $H(CF_2)_4CH_2OH$, methanol, ethanol, 1-propanol, isopropanol, n-butanol, 2-butanol, t-butanol, acetone, acetonitrile, 1,2-dimethoxyethane, cyclopentane, hexane, cyclohexane and heptane may be mentioned.

The amount of each of the agglomeration medium and the washing medium is preferably from 3 to 20 times by mass, more preferably from 3 to 15 times by mass, the fluorinated polymer. If the amount of the washing medium is small, the polymer may not sufficiently be washed at one time, and repeated washing will be necessary. If the amount of the washing medium is large, a treatment after washing such as recovery and evaporation will take long. Further, the number of washing relates the amount of the washing medium, and if the amount of the washing medium is large, washing is completed at one time, and if the amount of the washing medium is small, the number of washing increases.

The solid liquid separation after agglomeration and washing may be carried out by filtration after agglomeration and washing, or a poor solvent may be added to precipitate the fluorinated polymer and then filtration is carried out. Otherwise, filtration may be carried out after agglomeration and washing, filtration is suspended, a poor solvent is added, followed by stirring for mixing, and then filtration is carried out again. Otherwise, in addition to filtration, another method such as decantation or centrifugal separation may be carried out.

(Fluorinated Polymer Having Cyclic Structure and Ion Exchange Group)

The fluorinated polymer having a cyclic structure and ion exchange groups is produced by converting, of a fluorinated polymer having a cyclic structure and $-SO_2F$ groups, the $-SO_2F$ groups to ion exchange groups (such as $-SO_3^-H^+$).

To convert the $-SO_2F$ groups to ion exchange groups, the method disclosed in WO2011/013578 may be mentioned. For example, as a method of converting the $-SO_2F$ groups to sulfonic acid groups ($-SO_3^-H^+$ groups), a method of hydrolyzing the $-SO_2F$ groups of a fluorinated polymer into a sulfonate, and converting the sulfonate into an acid form to convert the sulfonate into sulfonic acid groups may be mentioned. (Application of fluorinated polymer having cyclic structure and ion exchange group)

The fluorinated polymer having a cyclic structure and ion exchange groups is suitable for formation of a catalyst layer and a polymer electrolyte membrane in a membrane/electrode assembly. Further, it is also useful for formation of other membranes (such as a proton permselective membrane to be used for e.g. water electrolysis, hydrogen peroxide production, ozone production or waste acid recovery, a cation exchange membrane for electrolysis of sodium chloride, a diaphragm of a redox flow cell, or a cation exchange membrane for electrodialysis to be used for desalination or salt production.

In the above-described process for producing a fluorinated polymer of the present invention, the cyclic structure monomer is recovered from the mixture containing the fluorinated polymer and the unreacted cyclic structure monomer at a temperature of at most the maximum ultimate temperature of the polymerization temperature+12° C. and at most the 10 hour half-life temperature of the polymerization initiator+12° C. under a pressure of less than the atmospheric pressure, and accordingly the unreacted cyclic monomer is hardly decomposed or polymerized by the presence of an unreacted polymerization initiator in the mixture. As a result, the unreacted cyclic structure monomer can efficiently be recovered. The present invention is characterized in that so as to efficiently recover the unreacted cyclic structure monomer, the temperature conditions at the time of recovery are determined considering not only the reactivity of the unreacted cyclic structure monomer but also the 10 hour half-life temperature of the unreacted polymerization initiator.

EXAMPLES

Now, the present invention will be described in further detail with reference to Examples. However, it should be understood that the present invention is by no means restricted to such specific Examples.

Ex. 1 to 4 are Examples of the present invention, and Ex. 5 and 6 are Comparative Examples.

(Compound (m13))

As the compound (m13), compound (m13-1) was prepared.

(m13-1)

(Compound (m21))

As the compound (m21), compound (m21-1) was prepared.

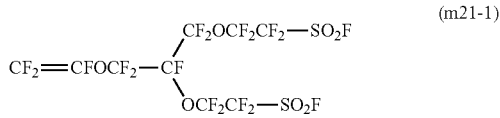
(m21-1)

(Polymerization Initiator)

Compound (i-1): $(C_3F_7COO)_2$ (manufactured by NOF CORPORATION, PFB, 10 hour half-life temperature: 21° C.).

Compound (i-2): dimethyl 2,2'-azobis(2-methylpropionate) (manufactured by Wako Pure Chemical Industries, Ltd., V-601, 10 hour half-life temperature: 66° C.).

Compound (i-3): $((CH_3)_2CHOCOO)_2$ (manufactured by NOF CORPORATION, PEROYL (registered trademark) IPP, 10 hour half-life temperature: 41° C.). (Solvent)

Compound (s-1): $CF_3CF_2CF_2CF_2CF_2CF_2H$ (manufactured by Asahi Glass Company, Limited, ASAHIKLIN (registered trademark) AC-2000), Compound (s-2): $CClF_2CF_2CHClF$

Ex. 1

Step (I):

Into a 2,575 mL (milliliter) stainless steel autoclave equipped with a jacket and a stirring apparatus, 1,098.64 g of compound (m21-1) was charged under reduced pressure while the autoclave was cooled with ice water, and the autoclave was deaerated. Then, 305.1 of compound (m13-1) was charged into the autoclave. The temperature in the autoclave was increased to 24° C., and 0.1 MPa (gage) of nitrogen gas was introduced into the autoclave. No change of the pressure was confirmed, and then 48.69 g of TFE was charged into the autoclave to adjust the total pressure to 0.22 MPa (gage). 0.421 g of a 2.26 mass % compound (i-1) solution dissolved in 18.23 g of compound (s-2) was added to the autoclave under pressure with nitrogen gas, and the addition line was washed with 3 g of compound (s-1). The number of revolutions for stirring during polymerization was decreased from 100 rpm to 50 rpm and then to 15 rpm so that the temperature difference between the jacket and the internal temperature would be minimum, at an internal temperature (polymerization temperature) of the autoclave being 24° C. 24 hours after the start of polymerization, the gas in the system was purged to conduct replacement with nitrogen.

Step (II):

The set temperature of the jacket was adjusted at 24° C., the number of revolutions for stirring was adjusted at 5 rpm, and the pressure in the autoclave was slowly reduced to 200 kPa (abs), and distillation of unreacted compound (m13-1), the solvent, etc. from the mixed liquid in the autoclave was started. The set temperature of the jacket was gradually increased to 28° C., and the distillate was made to pass through a cooling trap of the mixed liquid of compound (s-2) and dry ice, and 4 hours later, 83.52 g of the distillate was obtained, during which the pressure in the autoclave was gradually decreased. The proportion of compound (m13-1) in the distillate was 75 mass % by gas chromatography analysis.

The theoretical amount of unreacted compound (m13-1) was calculated from the amount of charged compound (m13-1) and the amount of compound (m13-1) consumed by the reaction calculated from the proportions of the respective structural units of the obtained fluorinated polymer. The proportion of the amount of the recovered unreacted compound (m13-1) based on the theoretical amount of unreacted compound (m13-1), that is, the recovery rate of compound (m13-1) was 96.8 mass %.

Step (III):

The residue in the autoclave was diluted with 1,600 g of compound (s-1), followed by stirring at a number of revolutions of 20 rpm for 16 hours to obtain a polymer solution.

To an agglomeration medium (20° C.) containing 5,004 g of compound (s-1) and 1,250 g of methanol, the polymer solution at 25° C. withdrawn from the autoclave was added to form a fluorinated polymer in the form of particles thereby to obtain a dispersion. After stirring for 30 minutes, 3,403 g of the polymer particle dispersion was withdrawn, to which 1,055 g of methanol was added. After stirring for 30 minutes, the dispersion was subjected to filtration to obtain a fluorinated polymer in the form of particles.

A washing treatment of adding the fluorinated polymer in the form of particles to a washing medium containing 1,005 g of compound (s-1) and 428 g of methanol, followed by stirring and filtration, was repeated three times.

The fluorinated polymer in the form of particles was vacuum dried at 80° C. for 16 hours and vacuum heat-treated at 240° C. for 16 hours to obtain 426.9 g of a fluorinated polymer.

The proportions of the respective structural units in the fluorinated polymer by $^{19}$F-NMR were such that compound (m21-1)/compound (m13-1)/TFE=18.0/67.3/14.7 (molar ratio), and the ion exchange capacity of the fluorinated polymer calculated from the proportions was 1.23 meq/g dry resin. The TQ value was 272° C.

The results are summarized in Tables 1 and 2.

Ex. 2 to 6

Fluorinated polymers were obtained in the same manner as in Ex. 1 except that the amounts of the compounds, the production conditions, etc. were changed as identified in Tables 1 to 4. The results are summarized in Tables 1 to 4.

TABLE 1

| | | | | Ex. 1 | Ex. 2 | Ex. 3 |
|---|---|---|---|---|---|---|
| Step (I) | Volume of autoclave | | mL | 2,575 | 1,006 | 21,100 |
| | Monomer | (m21-1) | g | 1,098.64 | 583.12 | 8,461 |
| | | (m13-1) | g | 305.1 | 143.3 | 2,502 |
| | | TFE | g | 48.69 | 17.35 | 406 |
| | Polymerization medium | (s-1) | g | | 50.03 | |

TABLE 1-continued

|  |  |  |  | Ex. 1 | Ex. 2 | Ex. 3 |
|---|---|---|---|---|---|---|
|  | Polymerization | (i-1) | g | 0.421 | 0.172 | 3.309 |
|  | initiator | (i-2) | g |  |  |  |
|  |  | (i-3) | g |  |  |  |
|  | 10 hour half-life temperature of polymerization initiator |  | °C. | 21 | 21 | 21 |
|  | Polymerization | (s-2) | g | 18.23 |  | 104.5 |
|  | initiator solvent | (s-1) | g |  | 5.94 |  |
|  | Polymerization initiator concentration |  | mass % | 2.26 | 2.81 | 3.07 |
|  | Line washing solvent | (s-1) | g | 3 | 4 | Washed with 320 g of (m21-1) |
|  | Polymerization temperature |  | °C. | 24 | 24 | 24 |
|  | Nitrogen gas pressure |  | MPa (gage) | 0.1 | 0.2 | 0.2 |
|  | Total pressure |  | MPa (gage) | 0.22 | 0.29 | 0.325 |
|  | Polymerization time |  | hour | 24 | 8 | 24 |
|  | Number of revolutions for stirring |  | rpm | 100→50 →15 | 100 | 100→56→22 →15→10 |
| Step (II) | Number of revolutions for stirring |  | rpm | 5 | 10 | 2 |
|  | Jacket set temperature |  | °C. | 24→28 | 24 | 13.5→24 |
|  | Distillation time |  | hour | 4 | 3 | 6.5 |
|  | Distillation amount |  | g | 83.52 | 119.4 | 534 |
|  | Proportion of (m13-1) in distillate |  | mass % | 75 | 59 | 88 |
|  | (m13-1) recovery amount |  | g | 62.64 | 69.97 | 468.32 |
|  | (m13-1) theoretical recovery amount |  | g | 64.72 | 75.26 | 469.83 |
|  | (m13-1) recovery rate |  | mass % | 96.8 | 93.0 | 99.7 |

TABLE 2

|  |  |  |  | Ex. 1 | Ex. 2 | Ex. 3 |
|---|---|---|---|---|---|---|
| Step (III) polymer solution preparation | Solvent added | (s-1) | g | 1,600 | 500 | 12,064 |
|  | Number of revolutions for stirring |  | rpm | 20 | 50 | 25 |
|  | Stirring time |  | hour | 16 | 16 | 14 |
| Step (III) agglomeration | Mixing method |  |  | Solution was added to agglomeration medium | Solution was added to agglomeration medium | Solution was added to agglomeration medium |
|  | Agglomeration medium | (s-1) | g | 5,004 | 2,003 | 36,116 |
|  |  | Methanol | g | 1,250 | 500 | 9,025 |
|  | Amount withdrawn |  | g | 3,403 | 1,303 | 28,630 |
|  | Added methanol |  | g | 1,055 | 375 | 8,702 |
|  | Solid liquid separation method |  |  | Filtration | Filtration | Filtration |
|  | Washing medium | (s-1) | g | 1005 | 290 | 8,300 |
|  |  | Methanol | g | 428 | 123 | 3,500 |
| Step (III) washing | Washing method |  |  | Washed with mixed liquid | Washed with mixed liquid | Washed with mixed liquid |
|  | Solid-liquid separation method |  |  | Filtration | Filtration | Filtration |
|  | Number of times of washing |  | time | 3 | 3 | 5 |
| Vacuum drying | Temperature |  | °C. | 80 | 80 | 80 |
|  | Time |  | hour | 16 | 16 | 16 |
| Vacuum heat treatment | Temperature |  | °C. | 240 | 240 | 240 |
|  | Time |  | hour | 16 | 16 | 16 |
|  | Yield |  | g | 426.9 | 116.4 | 3,595 |
|  | TQ value |  | °C. | 272 | 274 | 270 |
|  | Proportions of structural units | (m21-1) | mol % | 18.0 | 16.6 | 17.3 |
|  |  | (m13-1) | mol % | 67.3 | 68.5 | 66.4 |
|  |  | TFE | mol % | 14.7 | 14.9 | 16.3 |
|  | Ion exchange capacity |  | meq/g | 1.23 | 1.16 | 1.21 |

TABLE 3

|  |  |  |  | Ex. 4 | Ex. 5 | Ex. 6 |
|---|---|---|---|---|---|---|
| Step (I) | Volume of autoclave |  | mL | 230 | 1,006 | 230 |
|  | Monomer | (m21-1) | g | 151.83 | 386.7 | 151.88 |
|  |  | (m13-1) | g | 30.63 | 107.6 | 30.62 |
|  |  | TFE | g |  | 16.76 |  |

TABLE 3-continued

|  |  |  |  | Ex. 4 | Ex. 5 | Ex. 6 |
|---|---|---|---|---|---|---|
|  | Polymerization medium | (s-1) | g |  | 50 |  |
|  | Polymerization initiator | (i-1) | g |  | 0.12 |  |
|  |  | (i-2) | g | 0.0551 |  |  |
|  |  | (i-3) | g |  |  | 0.0553 |
|  | 10 hour half-life temperature of polymerization initiator |  | ° C. | 66 | 21 | 41 |
|  | Polymerization initiator solvent | (s-2) | g |  | 5.21 |  |
|  |  | (s-1) | g |  |  |  |
|  | Polymerization initiator concentration |  | mass % |  | 2.25 |  |
|  | Line washing solvent | (s-1) | g |  | 4 |  |
|  | Polymerization temperature |  | ° C. | 57 | 24 | 40 |
|  | Nitrogen gas pressure |  | MPa (gage) | 0.2 | 0.2 | 0.2 |
|  | Total pressure |  | MPa (gage) | 0.176 | 0.28 | 0.15 |
|  | Polymerization time |  | hour | 24 | 24 | 23 |
|  | Number of revolutions for stirring |  | rpm | 100 | 100→50 | 100 |
| Step (II) | Number of revolutions for stirring |  | rpm | 10 | 20 | 10 |
|  | Jacket set temperature |  | ° C. | 55 | 24→38 | 55 |
|  | Distillation time |  | hour | 2.5 | 3.3 | 2.8 |
|  | Distillation amount |  | g | 18.67 | 75.82 | 11.16 |
|  | Proportion of (m13-1) in distillate |  | mass % | 98 | 32.8 | 98 |
|  | (m13-1) recovery amount |  | g | 18.30 | 24.87 | 10.94 |
|  | (m13-1) theoretical recovery amount |  | g | 21.97 | 33.61 | 14.84 |
|  | (m13-1) recovery rate |  | mass % | 83.3 | 74.0 | 73.7 |

TABLE 4

|  |  |  |  | Ex. 4 | Ex. 5 | Ex. 6 |
|---|---|---|---|---|---|---|
| Step (III) polymer solution preparation | Solvent added | (s-1) | g | 185.08 | 480 | 210 |
|  | Number of revolutions for stirring |  | rpm | 25 | 50 | 25 |
|  | Stirring time |  | hour | 0.5 | 15 | 0.5 |
| Step (III) agglomeration | Mixing method |  |  | Agglomeration medium was added to solution | Solution was added to agglomeration medium | Agglomeration medium was added to solution |
|  | Agglomeration medium | (s-1) | g |  | 2,003 |  |
|  |  | Methanol | g | 77.3 | 501 | 110 |
|  | Amount withdrawn |  | g |  | 1,745 |  |
|  | Added methanol |  | g |  | 420 |  |
|  | Solid liquid separation method |  |  | Decantation | Filtration | Decantation |
| Step (III) washing | Washing medium | (s-1) | g | 150 | 295 | 210 |
|  |  | Methanol | g | 150 | 126 | 130 |
|  | Washing method |  |  | Dissolved in (s-1) and mixed with methanol | Washed with mixed liquid | Dissolved in (s-1) and mixed with methanol |
|  | Solid-liquid separation method |  |  | Decantation | Filtration | Decantation |
|  | Number of times of washing |  | time | 4 | 3 | 3 |
| Vacuum drying | Temperature |  | ° C. | 80 | 80 | 80 |
|  | Time |  | hour | 16 | 16 | 16 |
| Vacuum heat treatment | Temperature |  | ° C. | 240 | 240 | 240 |
|  | Time |  | hour | 16 | 16 | 16 |
|  | Yield |  | g | 16.73 | 129 | 31.91 |
|  | TQ value |  | ° C. | 243 | 279 |  |
|  | Proportions of structural units | (m21-1) | mol % | 26.6 | 17.1 | 28.5 |
|  |  | (m13-1) | mol % | 73.4 | 67.9 | 71.5 |
|  |  | TFE | mol % |  | 15.0 |  |
|  | Ion exchange capacity |  | meq/g | 1.54 | 1.19 | 1.62 |

In Ex. 1 to 4, the recovery rate of the cyclic structure monomer was high since the cyclic structure monomer was recovered from the mixture at a temperature of at most the polymerization temperature+12° C. and at most the 10 hour half-life temperature of the polymerization initiator+12° C. under a pressure of less than the atmospheric pressure.

In Ex. 5 and 6, the recovery rate of the cyclic structure monomer was low since the temperature at which the cyclic structure monomer was recovered from the mixture was higher than the polymerization temperature+12° C. and the 10 hour half-life temperature of the polymerization initiator+12° C.

INDUSTRIAL APPLICABILITY

The fluorinated polymer obtained by the production process of the present invention is useful as a precursor of an electrolyte material to be used for a catalyst layer or a polymer electrolyte membrane in a membrane/electrode assembly, a cation exchange membrane for electrolysis of sodium chloride, etc.

This application is a continuation of PCT Application No. PCT/JP2016/073780, filed on Aug. 12, 2016, which is based upon and claims the benefit of priority from Japanese Patent Application No. 2015-163725 filed on Aug. 21, 2015. The contents of those applications are incorporated herein by reference in their entireties.

The invention claimed is:

1. A process for producing a fluorinated polymer, which comprises polymerizing a monomer component containing at least one cyclic structure monomer selected from the group consisting of a compound represented by the following formula (m11), a compound represented by the following formula (m12), a compound represented by the following formula (m13) and a compound represented by the following formula (m14) in the presence of a polymerization initiator at a predetermined polymerization temperature to obtain a mixture containing a fluorinated polymer and an unreacted cyclic structure monomer, and recovering the cyclic structure monomer from the mixture at a temperature of at most the maximum ultimate temperature of the polymerization temperature+12° C. and at most the 10 hour half-life temperature of the polymerization initiator+12° C. under a pressure of less than the atmospheric pressure:

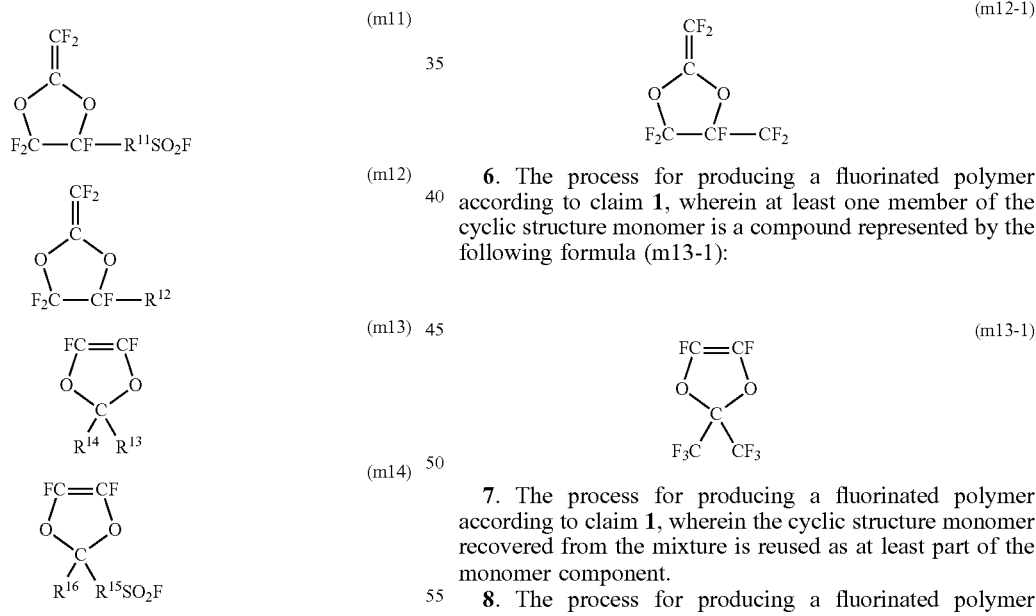

wherein each of $R^{11}$, $R^{12}$, $R^{13}$, $R^{14}$, $R^{15}$ and $R^{16}$ is a $C_{1-10}$ perfluoroalkylene group or a group having an etheric oxygen atom in a carbon-carbon bond of a $C_{2-10}$ perfluoroalkylene group.

2. The process for producing a fluorinated polymer according to claim 1, wherein the proportion of the cyclic structure monomer recovered from the mixture is at least 75 mass % based on the cyclic structure monomer (100 mass %) contained in the mixture.

3. The process for producing a fluorinated polymer according to claim 1, wherein the monomer component further contains at least one —SO$_2$F group-containing monomer selected from the group consisting of a compound represented by the following formula (m21), a compound represented by the following formula (m22) and a compound represented by the following formula (m23):

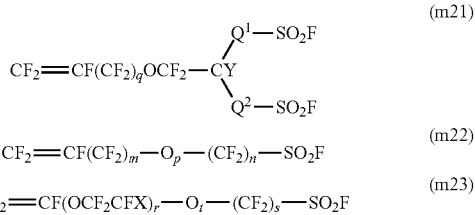

wherein q is 0 or 1, Y is a fluorine atom or a monovalent perfluoroorganic group, $Q^1$ is a perfluoroalkylene group which may have an etheric oxygen atom, $Q^2$ is a single bond or a perfluoroalkylene group which may have an etheric oxygen atom, m is 0 or 1, provided that m is 0 when p is 0, p is 0 or 1, n is an integer of from 1 to 12, X is a fluorine atom or a trifluoromethyl group, r is an integer of from 1 to 3, t is 0 or 1, and s is an integer of from 1 to 12.

4. The process for producing a fluorinated polymer according to claim 1, wherein the monomer component further contains tetrafluoroethylene.

5. The process for producing a fluorinated polymer according to claim 1, wherein at least one member of the cyclic structure monomer is a compound represented by the following formula (m12-1):

(m12-1)

$$\begin{array}{c} CF_2 \\ \parallel \\ C \\ O \diagup \diagdown O \\ F_2C-CF-CF_2 \end{array}$$

6. The process for producing a fluorinated polymer according to claim 1, wherein at least one member of the cyclic structure monomer is a compound represented by the following formula (m13-1):

(m13-1)

$$\begin{array}{c} FC=CF \\ O \diagup \diagdown O \\ \diagdown C \diagup \\ F_3C \quad CF_3 \end{array}$$

7. The process for producing a fluorinated polymer according to claim 1, wherein the cyclic structure monomer recovered from the mixture is reused as at least part of the monomer component.

8. The process for producing a fluorinated polymer according to claim 7, which comprises polymerizing the monomer component in a polymerization medium to obtain a mixture containing the fluorinated polymer, the unreacted cyclic structure monomer and the polymerization medium, and recovering a monomer solution containing the cyclic structure monomer and the polymerization medium from the mixture and reusing the monomer solution as at least part of the monomer component and as at least part of the polymerization medium.

* * * * *